US010324561B2

(12) United States Patent
Cho et al.

(10) Patent No.: US 10,324,561 B2
(45) Date of Patent: Jun. 18, 2019

(54) DISPLAY DEVICE INCLUDING TOUCH SCREEN AND DRIVING CIRCUIT FOR DRIVING DISPLAY DEVICE

(71) Applicant: LG Display Co., Ltd., Seoul (KR)

(72) Inventors: Youngsung Cho, Goyang-si (KR); Joungmi Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 81 days.

(21) Appl. No.: 15/295,831

(22) Filed: Oct. 17, 2016

(65) Prior Publication Data
US 2017/0115807 A1 Apr. 27, 2017

(30) Foreign Application Priority Data

Oct. 27, 2015 (KR) .................. 10-2015-0149800

(51) Int. Cl.
*G06F 3/041* (2006.01)
*G06F 3/044* (2006.01)
*G09G 3/36* (2006.01)

(52) U.S. Cl.
CPC ............ *G06F 3/0416* (2013.01); *G06F 3/044* (2013.01); *G06F 3/0412* (2013.01); *G09G 3/3677* (2013.01); *G09G 2300/0408* (2013.01); *G09G 2310/0286* (2013.01); *G09G 2354/00* (2013.01)

(58) Field of Classification Search
CPC ...... G06F 3/0416; G06F 3/0412; G06F 3/044; G09G 3/3677
See application file for complete search history.

(56) References Cited

U.S. PATENT DOCUMENTS

| 2003/0030615 | A1* | 2/2003 | Maeda | G09G 3/3648 345/90 |
| 2014/0049508 | A1* | 2/2014 | Kim | G06F 3/044 345/174 |
| 2014/0340387 | A1* | 11/2014 | Song | G09G 5/18 345/213 |
| 2016/0274713 | A1* | 9/2016 | Zhang | G06F 3/041 |

FOREIGN PATENT DOCUMENTS

KR 10-2013-0129620 11/2013

* cited by examiner

*Primary Examiner* — Towfiq Elahi
(74) *Attorney, Agent, or Firm* — Fenwick & West LLP

(57) ABSTRACT

A display device including a touch screen and a driving circuit of the display device are disclosed. A display panel of the display device is driven while being divided into a first block, to which data is applied during a first display period, and a second block, to which data is applied during a second display period following a touch sensing period. A display driving circuit includes an (N−1)th stage driving a last gate line of the first block and an Nth stage driving a first gate line of the second block. The Nth stage includes a charger charging a Q node of the Nth stage in the touch sensing period in response to a multi-start signal before the second display period starts.

18 Claims, 16 Drawing Sheets

DISPLAY DEVICE INCLUDING TOUCH SCREEN AND DRIVING CIRCUIT FOR DRIVING DISPLAY DEVICE

CROSS-REFERENCE TO RELATED APPLICATIONS

This application claims priority under 35 U.S.C. 119(a) to Republic of Korea Patent Application No. 10-2015-0149800 filed on Oct. 27, 2015, which is incorporated herein by reference in its entirety.

BACKGROUND

1. Technical Field

The present disclosure relates to a display device including a touch screen, in which touch sensors are embedded in a pixel array, and a driving circuit for driving the display device.

2. Discussion of the Related Art

User interfaces (UIs) are configured to allow users to communicate with various electronic devices and to easily and comfortably control the electronic devices as they desire. Examples of UIs include a keypad, a keyboard, a mouse, an on-screen display (OSD), and a remote controller having an infrared communication function or a radio frequency (RF) communication function. User interface technology has continuously expanded to increase user's sensibility and handling convenience. UIs have been recently developed to include touch UIs, voice recognition UIs, 3D UIs, and the like.

A touch UI senses a touch input (or a user input) using a touch screen implemented on a display panel and transmits the touch input to an electronic device. The touch UI has been essentially adopted in portable information devices, such as smart phones, and use of the touch UI has been expanded to include uses in notebook computers, computer monitors, and home appliances.

A method for implementing a touch screen has been recently employed using a technology (hereinafter referred to as "in-cell touch sensor technology") for embedding touch sensors in a pixel array of a display panel. The touch sensors may be implemented as capacitive touch sensors sensing a touch input based on changes in a capacitance before and after the touch input.

In in-cell touch sensor technology, touch sensors may be installed in a display panel without an increase in a thickness of the display panel. Electrodes of pixels of the display panel may be used as touch electrodes of the touch sensors. As shown in FIG. 1, in the in-cell touch sensor technology, a common electrode for supplying a common voltage Vcom to pixels of a liquid crystal display may be divided to form touch electrodes C1 to C4. The touch electrodes C1 to C4 are connected to sensor lines SL. Because touch sensors Cs are embedded in a pixel array of a display panel, the touch sensors Cs are coupled with pixels through parasitic capacitances. In order to reduce signal interference (e.g., cross talk) attributable to coupling between the pixels and the touch sensors Cs in the in-cell touch sensor technology, one frame period is time-divided into a display period and a touch sensing period. The in-cell touch sensor technology supplies a reference voltage (i.e., the common voltage Vcom) of the pixel to the touch electrodes C1 to C4 during the display period and drives the touch sensors Cs and senses a touch input during the touch sensing period.

A display device includes a data driver supplying a data voltage to data lines of a display panel, a gate driver (also referred to as a gate driver circuit or a scan driver) supplying a gate pulse (also referred to as a scan pulse) to gate lines of the display panel, and a touch sensing unit (also referred to as a touch sensing circuit or touch driver circuit) driving touch sensors.

The gate driver sequentially shifts the gate pulse applied to the gate lines using a shift register. The gate pulse is synchronized with the data voltage (i.e., a pixel voltage) of an input image and sequentially selects each pixel to be charged to the data voltage. The shift register includes cascade-connected stages. The stages of the shift register receive a start signal or a carry signal received from a previous stage as the start signal and generate an output when a clock is input.

A screen of the display device may be divided into two or more blocks, and a touch sensing period may be assigned between a driving time of one block and a driving time of another block. For example, during a first display period, pixels of a first block may be driven, and data of the first block may be updated to current frame data. During a touch sensing period following the first display period, a touch input may be sensed. During a second display period following the touch sensing period, pixels of a second block may be driven, and data of the second block may be updated to current frame data. However, such a method may deteriorate the output characteristic of the gate pulse supplied to the gate lines, and as a result, lead to a reduction in image quality of the display device.

In the second block driven immediately after the touch sensing period, a voltage of a Q node at a stage of a shift register outputting a first gate pulse may be discharged during the touch sensing period due to a leakage current. Because the Q node is connected to a gate of a pull-up transistor, a decrease in the voltage of the Q node may make the bootstrapping of the pull-up transistor incomplete. Hence, the gate pulse, of which a voltage rises by the pull-up transistor, cannot rise to a normal voltage level. As a result, a luminance of pixels arranged on a first line in the second block is reduced due to a decrease in a voltage of a first gate pulse generated when the pixels of the second block starts to be driven, and a reduction in the image quality, such as a line dim, may appear. In the shift register, in which an output signal (for example, the gate pulse or the carry signal) of a previous stage is input to a start signal input terminal of a next stage, a reduction in the output characteristic of a stage generating a first gate pulse after the touch sensing period leads to a decrease in voltages of all of gate pulses generated after the first gate pulse. Further, there is no gate pulse generated after the first gate pulse.

SUMMARY OF THE INVENTION

The present disclosure provide a display device including a touch screen and a driving circuit for driving the display device capable of preventing a reduction in image quality of the display device, to which an in-cell touch sensor technology is applied, attributable to a touch sensing period.

In one aspect, there is provided a display device including a touch screen comprising a display panel including pixels at intersections of data lines and gate lines, grouped into a plurality of blocks, and dividedly driven, and a plurality of touch sensors (or touch electrodes). The display device also includes a display driving circuit configured to apply data of an input image to the pixels in a plurality of display periods divided from one frame period, a touch sensing unit configured to drive the touch sensors (or touch electrodes) in a touch sensing period assigned between the display periods of the one frame period to sense a touch input. The display device also includes a timing controller configured to generate a multi-start signal including a plurality of pulses at predetermined time intervals in the one frame period, and a gate shift clock controlling a shift timing of a gate pulse.

The first block of the display panel is driven during a first display period. The second block of the display panel is driven during a second display period following the touch sensing period.

The display driving circuit includes an (N−1)th stage driving a last gate line of the first block and an Nth stage driving a first gate line of the second block.

The Nth stage includes a charger (also referred to herein as a charger circuit) configured to charge a Q node of the Nth stage in the touch sensing period in response to the multi-start signal before the second display period starts.

In another aspect, there is provided a driving circuit of a display device including a touch screen comprising a touch sensing unit configured to drive the touch electrodes in a touch sensing period, a timing controller configured to generate a multi-start signal including a plurality of pulses at predetermined time intervals in one frame period, and a gate shift clock controlling a shift timing of a gate pulse, and a shift register including an (N−1)th stage driving a last gate line of the first block and an Nth stage driving a first gate line of the second block, the Nth stage including a charger configured to charge a Q node of the Nth stage in response to the multi-start signal before the second display period starts in the touch sensing period.

In another embodiment, a display panel includes a plurality of blocks of pixels at intersections of a plurality of gate lines and a plurality of data lines. The plurality of blocks of pixels includes at least a first block and a second block adjacent to the first block. The first block is driven to display during a first display period of a frame and the second block is driven to display during a second display period of the frame. The second display period is subsequent to the first display period and separated in time from the first display period by a predetermined period. The display panel also includes a gate driver circuit to drive gate lines of the display panel. The gate driver circuit includes at least a first stage and a second stage to drive a first gate line of the first block and a second gate line of the second block, respectively. The first gate line and the second gate line are adjacent to each other. The second stage includes a charger circuit configured to charge a Q node of the second stage during the predetermined period prior to the second display period. A gate pulse is supplied to the second gate line during at least a portion of the second display period when the Q node is charged to a predetermined level.

In some embodiments, the predetermined period is a touch sensing period during which touch electrodes of the display panel are driven with a touch drive signal. The display panel may also perform functions other than touch driving or touch sensing during the predetermined period.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. Detailed descriptions of known arts will be omitted if such may mislead the embodiments of the invention.

A display device according to embodiments herein may be implemented as a flat panel display, such as a liquid crystal display (LCD) or an organic light emitting diode (OLED) display. In the following description, embodiments of the invention will be described using a liquid crystal display as an example of a flat panel display. However, embodiments are not limited thereto, and other types of flat panel displays may be used. For example, a display device according to embodiments herein may be implemented as any display device to which in-cell touch sensor technology is applicable.

A touch sensor according to embodiments herein may be implemented as a capacitive touch sensor, which is able to be embedded in a pixel array, for example, a mutual capacitance touch sensor or a self-capacitance touch sensor. In the following description, embodiments will be described using a self-capacitance touch sensor as an example. However, embodiments of the invention are not limited thereto, and other types of touch sensors may be used.

Figure 1:
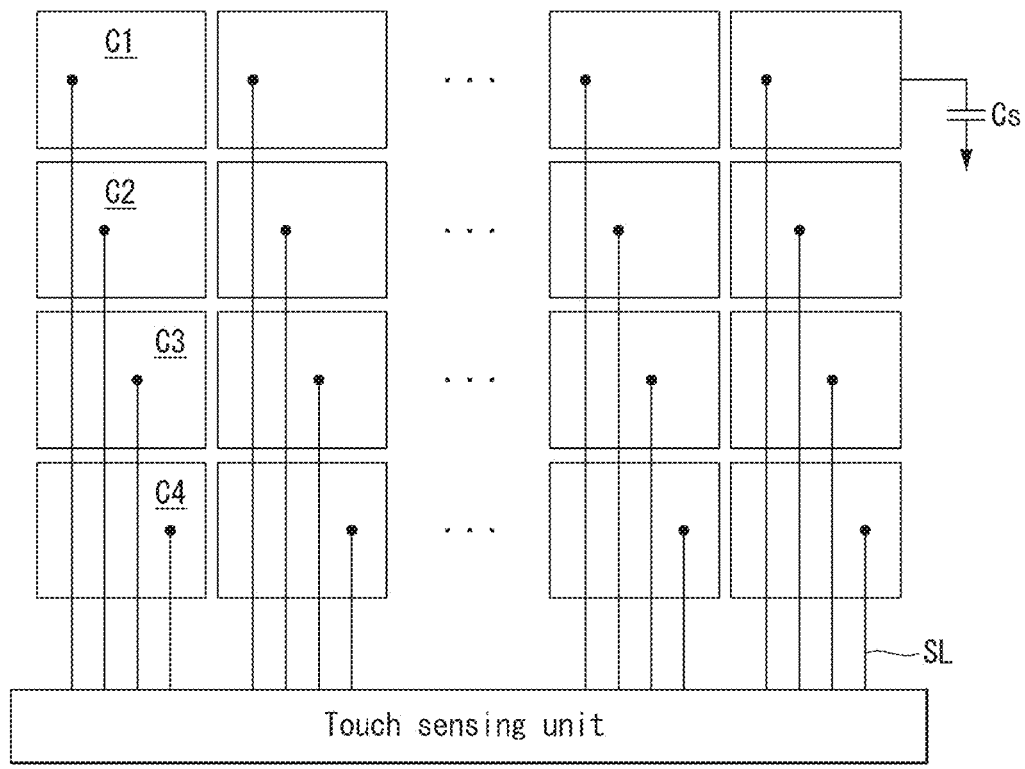
FIG. 1 is a plan view illustrating a touch electrode pattern of touch sensors and a touch sensing unit in a related art.
Figure 2:
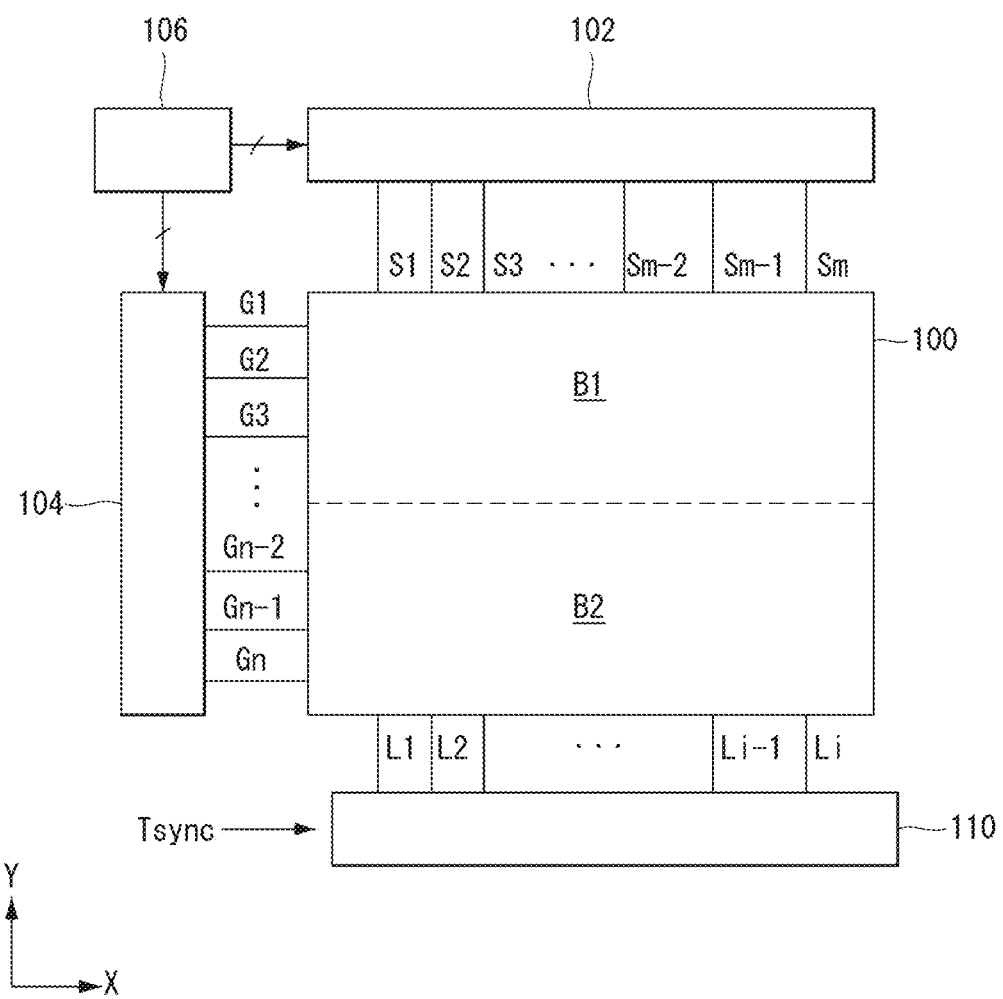
FIGS. 2 and 3 are block diagrams illustrating a display device according to an exemplary embodiment.
Figure 3:
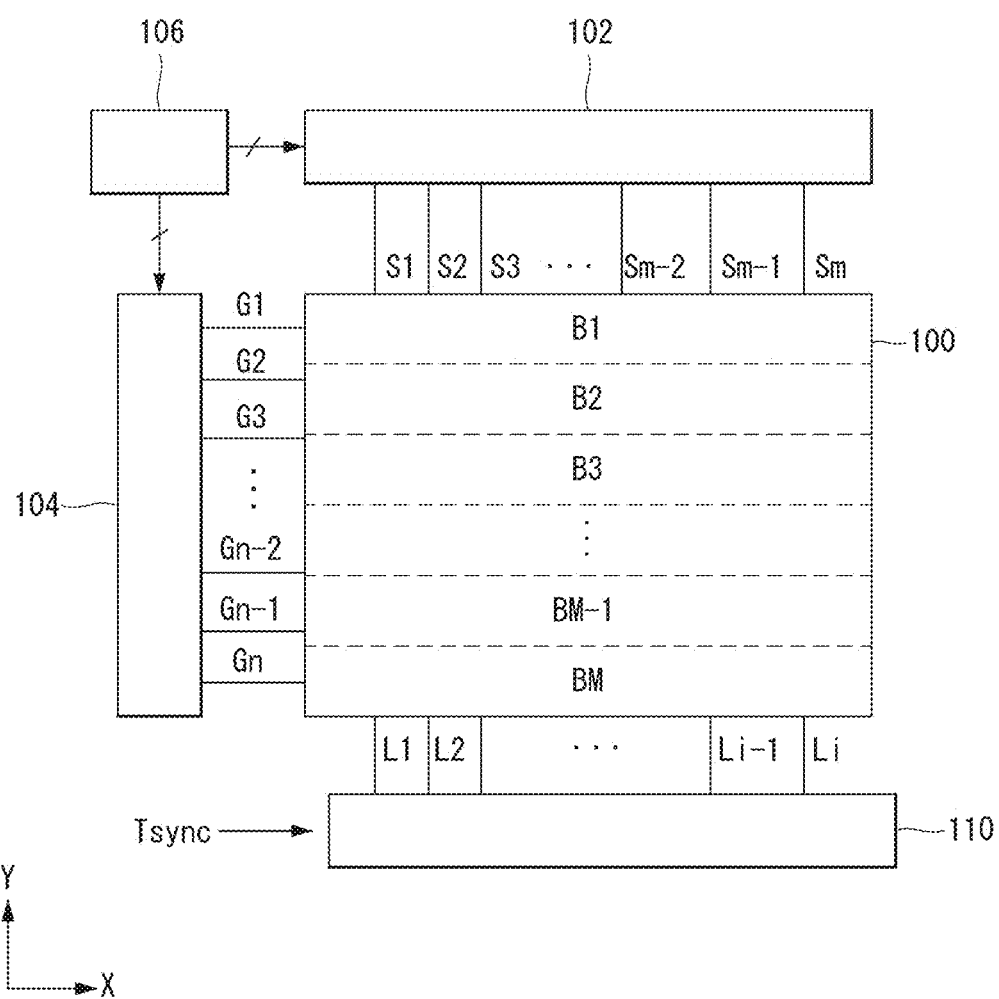

Referring to FIGS. 2 and 3, a display device according to an embodiment includes a display panel 100, a display driving circuit, and a touch sensing unit 110.

One frame period of the display panel 100 may be time-divided into one or more display periods and one or more touch sensing periods. A screen of the display panel 100 is time-division driven in two or more blocks B1 to BM. The blocks B1 to BM do not need to be physically separated. The display panel 100 includes pixels at intersections of data lines and gate lines. The pixels are grouped into the blocks, and dividedly driven block by block. The first block of the display panel 100 is driven during the first display period. The second block of the display panel 100 is driven during a second display period following the touch sensing period.

FIG. 2 illustrates an example where the screen of the display panel 100 is divided into two blocks B1 and B2. FIG. 3 illustrates an example where the screen of the display panel 100 is divided into M blocks B1 to BM, where M is a positive integer equal to or greater than 3. The blocks of the display panel 100 are time-division driven with a touch sensing period interposed therebetween. For example, during a first display period, pixels 11 (not shown in FIG. 2 but shown in FIG. 4) of a first block B1 are driven, and current frame data is applied to the pixels 11. During a first touch sensing period following the first display period, a touch input is sensed. During a second display period following the first touch sensing period, pixels 11 of a second block B2 are driven, and current frame data is applied to the pixels 11.

The screen of the display panel 100 includes a pixel array, on which an input image is reproduced. The pixel array includes m×n pixels 11 formed in pixel areas defined by m data lines S1 to Sm and n gate lines G1 to Gn, where m and n are a positive integer. Each pixel 11 includes thin film transistors (TFTs) formed at crossings of the data lines S1 to Sm and the gate lines G1 to Gn, a pixel electrode charged to a data voltage, a storage capacitor, Cst that is connected to the pixel electrode and holds the data voltage. The pixels 11 of the pixel array display the input image. A structure of the pixels 11 may be changed depending on driving characteristics of the display device.

The pixel array of the display panel 100 further includes touch electrodes C1 to C4 and sensor lines L1 to Li connected to the touch electrodes C1 to C4, where 'i' is a positive integer less than m and n. The touch electrodes C1 to C4 may be implemented using a method for dividing a common electrode connected to the pixels 11. One touch electrode is commonly connected to the plurality of pixels 11 and forms one touch sensor. Thus, the touch sensors supply a common voltage Vcom of the same level to the pixels 11 during the display period and are driven by the touch sensing unit 110 to sense a touch input during the touch sensing period.

Figure 4:
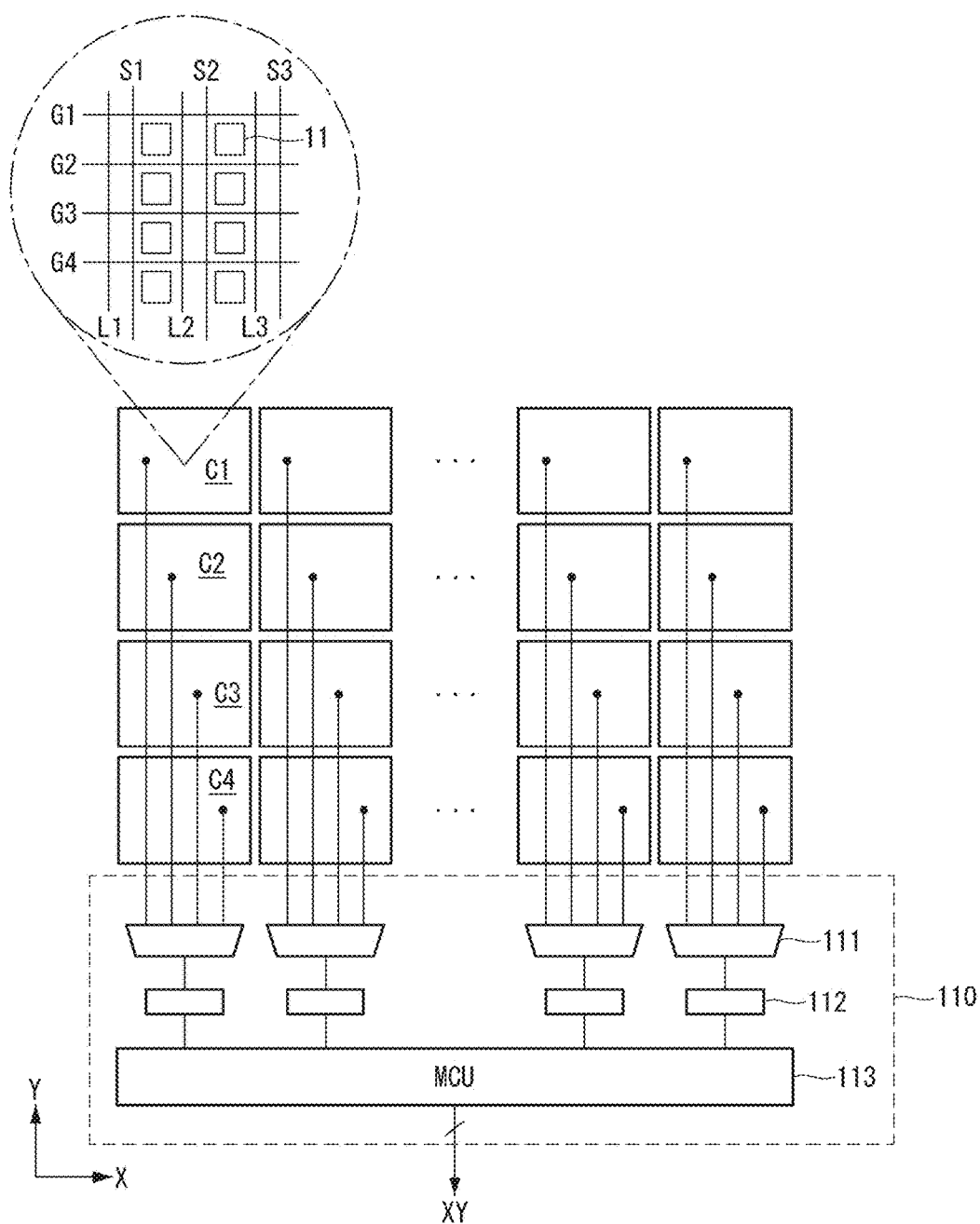
FIG. 4 illustrates a plan layout of in-cell touch sensors and a circuit configuration of a touch sensing unit.

The touch sensors embedded in the pixel array may be implemented as capacitive touch sensors. Each capacitive touch sensor may have a capacitance. The capacitance may be divided into a self-capacitance or a mutual capacitance. The self-capacitance may be formed along a conductor line of a single layer formed in one direction, and the mutual capacitance may be formed between two conductor lines perpendicular to each other. FIG. 4 shows a self-capacitance touch sensor as an example. The embodiment of the invention is not limited thereto.

Black matrixes, color filters, etc. may be formed on an upper substrate of the display panel 100.

The display driving circuit includes a data driver 102, a gate driver 104, and a timing controller 106 and applies data of an input image to the pixels 11 of the display panel 100 during the display period. During the display period, the data driver 102 converts digital video data of the input image received from the timing controller 106 into a gamma compensation voltage and outputs a data voltage through output channels. The data driver 102 then supplies the data voltage to the data lines S1 to Sm during the display period.

During the touch sensing period, the output channels of the data driver 102 are separated from the data lines S1 to Sm and may maintain a high impedance state. A voltage of the pixels 11 is held at the data voltage by the storage capacitor because the TFTs are not turned on during the touch sensing period.

A multiplexer (not shown) may be disposed between the data driver 102 and the data lines S1 to Sm. The multiplexer may be formed on a substrate of the display panel 100 or may be integrated into a driver integrated circuit (IC) together with the data driver 102. The multiplexer may distribute the data voltage received from the data driver 102 to the data lines S1 to Sm under the control of the timing controller 106. For example, a 1-to-2 multiplexer may time-divide the data voltage input through one output channel of the data driver 102 and supply the time-divided data voltages to two data lines S1 and S2. Thus, the use of the 1-to-2 multiplexer may reduce the number of output channels of a driver IC by half.

The gate driver 104 includes a shift register that sequentially outputs a gate pulse (or a scan pulse) to the gate lines G1 to Gn of the display panel 100 in response to a voltage of a Q node. During the display period, the gate driver 104 sequentially supplies the gate pulse synchronized with the data voltage to the gate lines G1 to Gn using the shift register and selects lines of the display panel 100, to which the data voltage is applied. During the touch sensing period, a shift clock is not input to the gate driver 104. As a result, the gate driver 104 does not output the gate pulse during the touch sensing period.

The timing controller 106 transmits the digital video data of the input image received from a host system (not shown) to the data driver 102. The timing controller 106 receives timing signals, such as a vertical sync signal Vsync, a horizontal sync signal Hsync, a data enable signal DE, and a main clock MCLK, in synchronization with data of the input image. The timing controller 106 generates a data timing control signal for controlling operation timing of the data driver 102 and a gate timing control signal for controlling operation timing of the gate driver 104 based on the timing signals.

The gate timing control signal includes a multi-start signal MVST, a gate shift clock CLK, a gate output enable signal GOE. The gate output enable signal GOE may be omitted in a gate in panel (GIP) circuit. The GIP circuit is a shift register circuit of the gate driver 104 disposed on a substrate of the display panel 100, on which the pixel array is formed. The multi-start signal MVST is input to a shift register of the gate driver 104 and controls start timing of a first gate pulse output from the shift register. The multi-start signal MVST according to the embodiment herein includes a plurality of pulses that are generated at predetermined time intervals in one frame period. The gate shift clock CLK controls shift timing of the shift register. The gate output enable signal GOE controls output timing of the gate driver 104. When the gate driver 104 is implemented as the GIP circuit, the gate timing control signal generated by the timing controller 106 is converted into a voltage swinging between a gate high voltage VGH and a gate low voltage VGL by a level shifter (not shown) and is input to the GIP circuit. Thus, the multi-start signal MVST and the gate shift clock CLK input to the GIP circuit swing between the gate high voltage VGH and the gate low voltage VGL. The gate high voltage VGH is greater than a threshold voltage of transistors constituting the GIP circuit and the pixel, and the gate low voltage VGL is less than the threshold voltage of the transistors. The host system may be one of a television system, a set-top box, a navigation system, a DVD player, a Blu-ray player, a personal computer (PC), a home theater system, a phone system, and other systems that include or operate in conjunction with a display. The host system includes a system on chip (SoC), in which a scaler is embedded, and converts the digital video data of the input image into a format suitable for displaying the input image on the display panel 100. The host system transmits the digital video data of the input image and the timing signals Vsync, Hsync, DE, and MCLK to the timing controller 106. Further, the host system executes an application associated with coordinate information (e.g., an X-Y coordinate point) of a touch input received from the touch sensing unit 110.

The touch sensing unit 110 drives the touch sensors in response to a sync signal Tsync received from the timing controller 106 or the host system during the touch sensing period. The touch sensing unit 110 supplies a touch driving signal to the sensor lines L1 to Li and senses a touch input during the touch sensing period. The touch sensing unit 110 analyzes a change in the amount of charge detected by the touch sensor, which varies depending on whether or not there is a touch input, determines the touch input, and calculates coordinates of a position of the touch input. The touch sensing unit 110 transmits coordinate information of the touch input position to the host system.

FIG. 4 illustrates a plan layout of in-cell touch sensors and a circuit configuration of the touch sensing unit 110.

Referring to FIG. 4, each of the touch electrodes C1 to C4 may be formed as a division pattern of a common electrode of a plurality of pixels.

The touch sensing unit 110 includes a plurality of multiplexers 111, a plurality of sensing circuits 112, and a microcontroller unit (MCU) 113.

The multiplexer 111 selects sensor lines L1 to L3 to be connected to the sensing circuits 112 under the control of the MCU 113 during the touch sensing period. Each multiplexer 111 sequentially connects N sensor lines L1 to L3 to a channel of the sensing circuit 112, thereby reducing the number of channels of the sensing circuit 112. The multiplexer 111 may supply the common voltage Vcom to the sensor lines L1 to L3 under the control of the MCU 113 during the display period.

The sensing circuit 112 amplifies and integrates an amount of charge of a sensor line signal received via the multiplexer 111 and converts it into digital data. The sensing circuit 112 includes an amplifier amplifying a received touch sensor signal, an integrator accumulating an output voltage of the amplifier, and an analog-to-digital converter (ADC) converting a voltage of the integrator into digital data. The sensing circuit 112 transmits digital data, as touch raw dart, output from the ADC to the MCU 113.

The MCU 113 controls the multiplexer 111 and connects the sensor lines L1 to L3 to the sensing circuit 112. The MCU 113 compares touch raw data received from the sensing circuit 112 with a predetermined threshold value and determines a touch input. The MCU 113 performs a predetermined touch sensing algorithm and calculates coordinates of a position of each touch input. The MCU 113 produces touch coordinate data (e.g., in the X and Y axis) and transmits the touch coordinate data XY to the host system.

Figure 5:
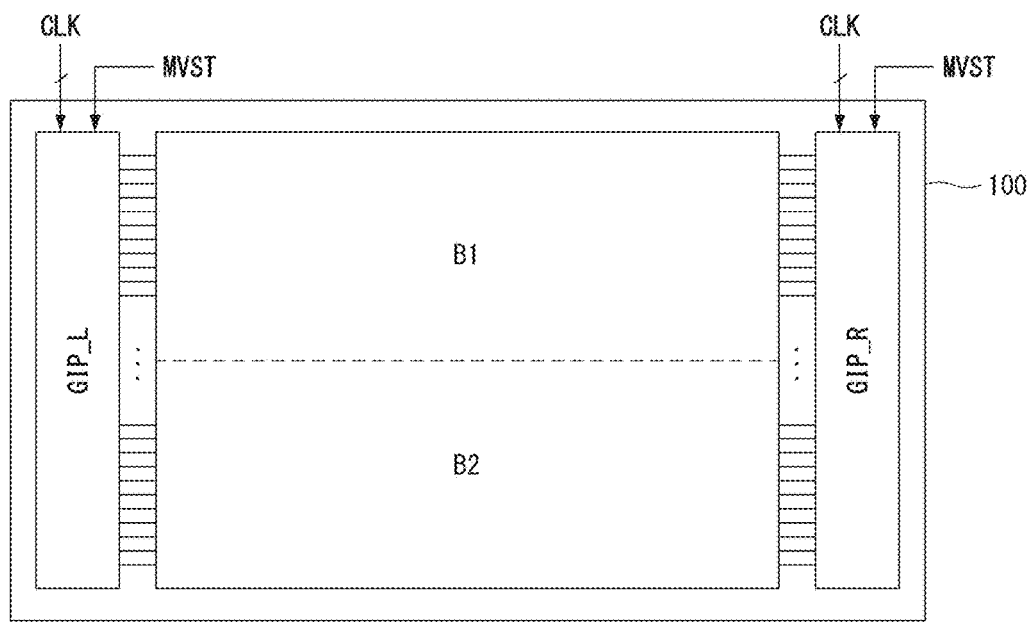
FIG. 5 illustrates an example where gate in panel (GIP) circuits are respectively disposed on both sides of a display panel.
Figure 6:
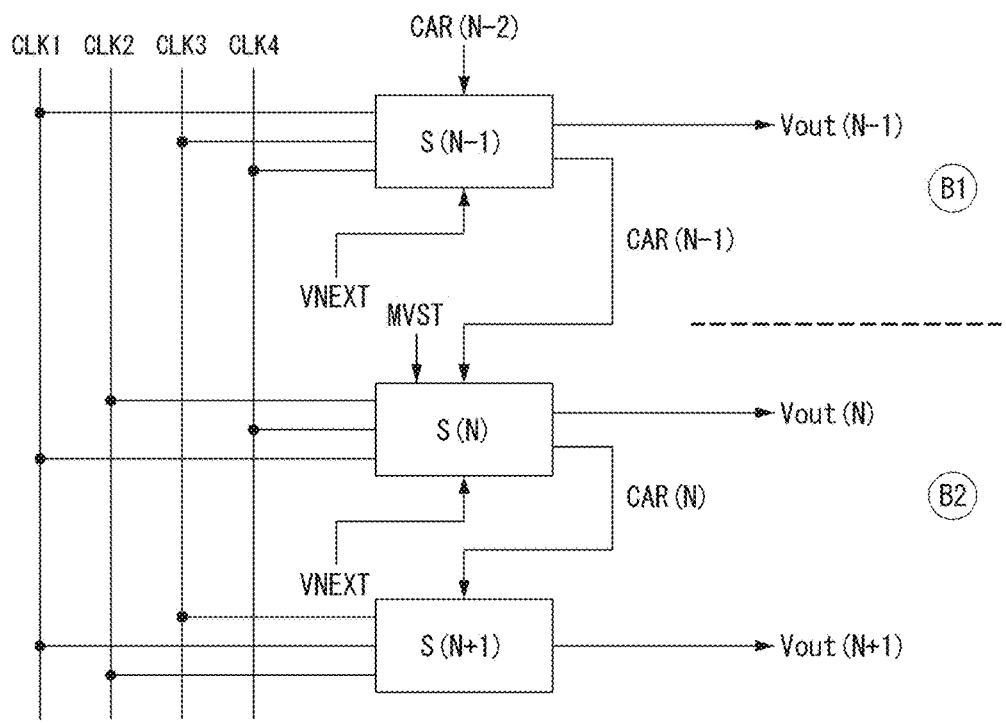
FIG. 6 schematically illustrates a part of a GIP circuit disposed at a boundary between adjacent blocks.

FIG. 5 illustrates an example where GIP circuits are respectively disposed on both sides of a display panel. FIG. 6 schematically illustrates a part of a GIP circuit disposed at a boundary between adjacent blocks.

Referring to FIGS. 5 and 6, the gate driver 104 may be implemented as a GIP circuit on a lower substrate of the display panel 100 on which the pixel array is formed, or may be implemented as a separate IC and attached to the lower substrate of the display panel 100.

The GIP circuit may be disposed at one edge of the display panel 100, or may be dividedly disposed at both edges of the display panel 100 as shown in FIG. 5. As shown in FIG. 5, GIP circuits GIP_L and GIP_R each include a shift register sequentially shifting a gate pulse under the control of the timing controller 106.

Transistors of the GIP circuits GIP_L and GIP_R may include at least one of a TFT including amorphous silicon (a-Si), an oxide TFT including oxide semiconductor, or a low-temperature polycrystalline silicon (LTPS) TFT including LTPS. In some embodiments, the transistors of the GIP circuits GIP_L and GIP_R are not limited to the TFT including a-Si.

The transistors of the GIP circuits GIP_L and GIP_R may be manufactured as the TFT including a-Si. Because a leakage current (i.e., an off-current) of the a-Si TFT flowing in an off-state is high, the a-Si TFT increases a discharge amount of a Q node during a touch sensing period. Due to the discharge, luminance is reduced at a boundary between adjacent blocks in B1 to BM, a phenomena referred to herein as "line dim." The display device according to the embodiments herein compensates for a decrease in a voltage of a Q node of a stage outputting a first gate pulse of a block that will be driven after the touch sensing period, thereby preventing the line dim.

Each of the GIP circuits GIP_L and GIP_R includes a shift register that receives a multi-start signal MVST and a gate shift clock CLK and sequentially outputs a gate pulse.

The first GIP circuit GIP_L is disposed outside the left side of the pixel array. The first GIP circuit GIP_L is connected to odd-numbered gate lines G1, G3, . . . , Gn-1 of the pixel array and sequentially outputs the gate pulse to the odd-numbered gate lines G1, G3, . . . , Gn-1. The first GIP circuit GIP_L supplies the gate pulse to the odd-numbered gate lines G1, G3, . . . , Gn-1 in response to odd-numbered gate shift clocks CL1 and CLK3 and shifts the gate pulse at each clock timing. The second GIP circuit GIP_R is disposed outside the right side of the pixel array. The shift register of the second GIP circuit GIP_R is connected to even-numbered gate lines G2, G4, . . . , Gn of the pixel array and sequentially outputs the gate pulse to the even-numbered gate lines G2, G4, . . . , Gn. The second GIP circuit GIP_R supplies the gate pulse to the even-numbered gate lines G2, G4, . . . , Gn in response to even-numbered gate shift clocks CL2 and CLK4 and shifts the gate pulse at each clock timing.

Each of the GIP circuits GIP_L and GIP_R includes a plurality of stages S(N-1) to S(N+1) that receive the multi-start signal MVST and the gate shift clock CLK (or CLK1 to CLK4) and are cascade-connected, where N is a positive integer equal to or greater than 2. The multi-start signal MVST is provided to an Nth stage, which outputs a first gate pulse through one line in each block. The multi-start signal MVST is input only to a first stage outputting the first gate pulse in each block and is not input to other stages of each block.

Each of the stages S(N-1) to S(N+1) includes a pull-up transistor, a pull-down transistor, a Q node controlling the pull-up transistor, a QB node controlling the pull-down transistor, and a controller controlling the Q node and the QB node in response to an input signal. Each of the stages S(N-1) to S(N+1) pre-charges the Q node in response to the multi-start signal MVST received to a VST terminal or carry signals CAR(N-1) and CAR(N) received from a previous stage and increases a voltage of an output terminal to the gate high voltage VGH when the gate shift clock is input, thereby starting to output the gate pulse. The controller of each of the stages S(N−1) to S(N+1) discharges the Q node in response to a reset signal received to a RST terminal or a VNEXT signal received from a next stage and charges the QB node. Any known circuit configuration may be applied to the controller of each stage.

Hereinafter, it is assumed that an (N−1)th stage is a last stage generating a last gate pulse in an (N−1)th block, and an Nth stage is a first stage generating a first gate pulse in an Nth block that is adjacent to and driven subsequent to the (N−1)th block.

In one embodiment, a Q charger (also referred to herein as a Q charger circuit) is coupled to a first stage in each of all of blocks except a first block. The Q charger pre-charges a Q node of the Nth stage to the gate high voltage VGH in response to the multi-start signal MVST, which may include any number of pulses, for example, the number of blocks or the number of blocks minus 1 during one frame period, during a touch sensing period before a next display period. Thus, the Q charger increases a voltage of the Q node, which is discharged during a gap in time between the display periods, e.g., during the touch sensing period, at a boundary between the blocks, which are dividedly driven in the display panel, and thus can prevent a phenomenon, in which a luminance is reduced at a boundary between the adjacent blocks, or the line dim.

A start pulse may be generated once in each frame period and in the initial of each frame period. On the contrary, the multi-start signal MVST according to the embodiment herein includes a plurality of pulses, which may include any number of pulses, for example, the number of blocks at predetermined time intervals during one frame period and is input to VST input terminals of the Nth stages of the blocks through one line.

Figure 10:
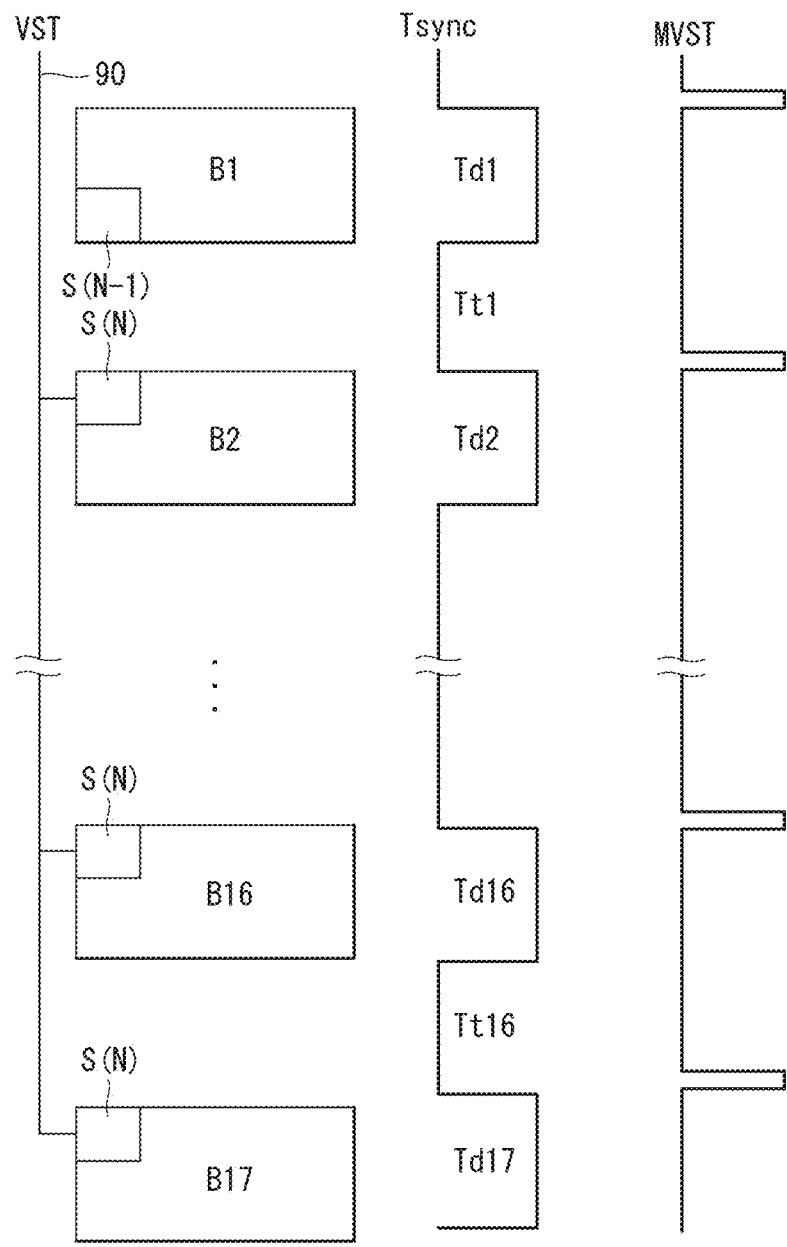
FIG. 10 illustrates a multi-start signal according to an exemplary embodiment.

It should be noted that the multi-start signal MVST according to the embodiment herein are simultaneously input to the first stages (i.e., the Nth stages S(N)) of the plurality of blocks through one line 90 (refer to FIG. 10). Thus, the number of MVST lines does not increase the bezel width of the display panel. The plurality of start pulses is input to the Nth stage S(N) of each block. However, the Q charger charges a Q node of an Nth stage S(N) of a block, to which the Q charger belongs, in response to the start pulse, that is input in synchronization with operation timing of the Nth stage S(N) to which the Q charger belongs, thereby preventing an abnormal output of the gate pulse.

Figure 7:
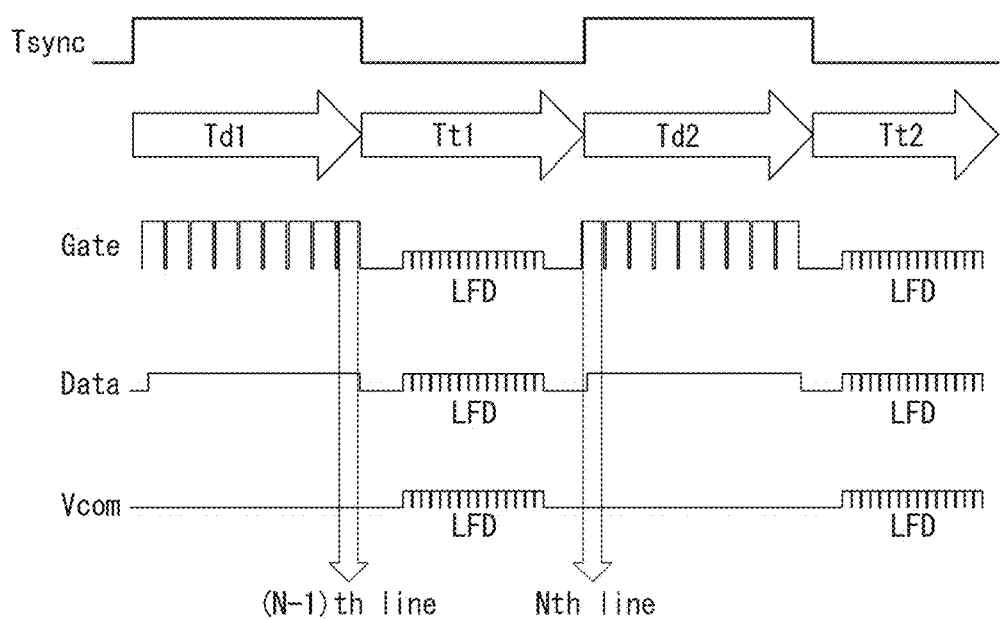
FIG. 7 is a waveform diagram illustrating a driving signal of a display device according to an exemplary embodiment.

FIG. 7 is a waveform diagram illustrating a driving signal of the display device according to one embodiment. In FIG. 7, "Gate" is a voltage applied to the gate lines G1 to Gn, "Data" is a voltage applied to the data lines S1 to Sm, and Vcom is a voltage applied to the touch sensor electrode.

Referring to FIG. 7, one frame period may be time-divided into display periods Td1 and Td2 and touch sensing periods Tt1 and Tt2. During a first display period Td1, the display driving circuit (102, 104, and 106) applies current frame data to pixels of a first block B1 and updates an image reproduced on the first block B1 to the current frame data.

During the first display period Td1, a remaining block B2 other than the first block B1 holds previous frame data, and the touch sensing unit 110 does not drive the touch sensors. Subsequently, during a first touch sensing period Tt1, the touch sensing unit 110 sequentially drives all of the touch sensors, senses a touch input, generates a touch report including coordinate information and identification information of each touch input, and transmits the touch report to the host system. During the first touch sensing period Tt1, the touch sensing unit 110 supplies a touch sensor driving signal to the touch sensor through the sensor lines L1 to Li, detects an amount of charges of the touch sensor before and after the touch input, compares the amount of charges with a threshold voltage, and determines the touch input.

Subsequently, during a second display period Td2, the display driving circuit (102, 104, and 106) applies current frame data to pixels of a second block B2 and updates an image reproduced on the second block B2 to the current frame data. During the second display period Td2, the first block B1 holds previous frame data, and the touch sensing unit 110 does not drive the touch sensors. Subsequently, during a second touch sensing period Tt2, the touch sensing unit 110 sequentially drives all of the touch sensors, senses a touch input, generates a touch report including coordinate information and identification information of each touch input, and transmits the touch report to the host system.

During the touch sensing periods Tt1 and Tt2, the touch sensing unit 110 supplies the touch sensor driving signal to the touch sensor through the sensor lines L1 to Li, detects an amount of charge of the touch sensor before and after the touch input, compares the amount of charge with a threshold voltage, and determines the touch input.

The touch sensing unit 110 transmits coordinate information of the touch input to the host system in each touch sensing period. Thus, a touch report rate is greater than a frame rate. The frame rate is a frame frequency at which an image of one frame is applied to the pixel array. The touch report rate is a speed at which the coordinate information of the touch input is generated. As the touch report rate increases, a coordinate recognition rate of the touch input increases. Hence, touch sensitivity is improved.

During the touch sensing periods Tt1 and Tt2, the data driver 102 may supply an AC signal referred to herein as load free drive (LFD) signal having the same phase and the same voltage as the touch sensor driving signal, so as to reduce a parasitic capacitance between the pixels 11 and the touch sensors. During the touch sensing periods Tt1 and Tt2, the gate driver 104 may supply the LFD signal having the same phase and the same voltage as the touch sensor driving signal, so as to reduce a parasitic capacitance between the pixels 11 and the touch sensors, in the same manner as the data driver 102. The touch sensing unit 110 supplies the LFD signal to sensor lines other than the sensor lines connected to the touch sensors sensing a current touch input, e.g., to the gate lines and/or the data lines, thereby preventing a parasitic capacitance between the adjacent touch sensors.

The in-cell touch sensor technology divides a common electrode of the pixels of the display panel 100 based on each touch sensor and uses the divided common electrodes as the touch electrodes of touch sensors. For example, when the liquid crystal display is used as described above, the in-cell touch sensor technology divides a common electrode and uses divided common electrode patterns as the touch electrodes of self-capacitance touch sensors shown in FIGS. 2 and 3. Because the touch sensors are coupled with and form part of the pixels, a parasitic capacitance between the pixels and the touch sensors increases. Because the pixels and the touch sensors are coupled with each other through the parasitic capacitance, the pixels and the touch sensors may electrically adversely affect each other. Therefore, as shown in FIG. 4, the pixels and the touch sensors are time-division driven. Even if the time-division driving method is used, the touch sensitivity and the touch recognition accuracy of the touch sensors may be reduced due to the parasitic capacitance of the display panel 100.

When the LFD signal having the same phase as the touch sensor driving signal is supplied to the data lines S1 to Sm and the gate lines G1 to Gn of the display panel 100 and the touch sensors, which are not currently connected, during the touch sensing periods Tt1 and Tt2, an amount of charge of a parasitic capacitance of the display panel 100 may decrease. This is because the amount of charge of the parasitic capacitance may be minimized by minimizing a voltage difference between both ends of the parasitic capacitance. Due to a decrease in parasitic capacitance of the touch sensor, the touch sensing unit 110 can improve a signal-to-noise ratio (abbreviated to SNR or S/N) of the touch sensor driving signal, increase an operating margin of the touch sensing unit 110, and improve the touch input and the touch sensitivity.

In FIG. 7, "(N−1)th line" is an (N−1)th gate line supplied with a last gate pulse of an (N−1)th block of pixels, and "Nth line" is an Nth gate line supplied with a first gate pulse of an Nth block of pixels starting again to drive the pixel subsequent to the touch sensing periods Tt1 and Tt2. The Nth block of pixels is adjacent to the (N−1)th block of pixels and are driven subsequent to the Nth block of pixels.

Figure 8A:
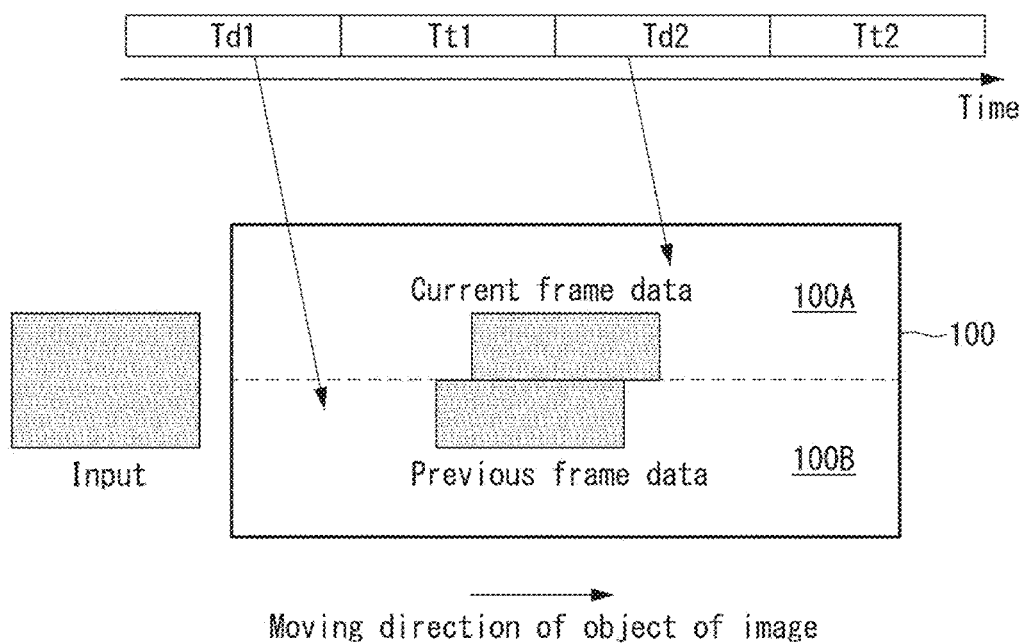
FIGS. 8A and 8B illustrate an example where a moving object is discontinuously seen at a boundary between blocks due to a touch sensing period when the moving object is displayed on a display device.
Figure 8B:
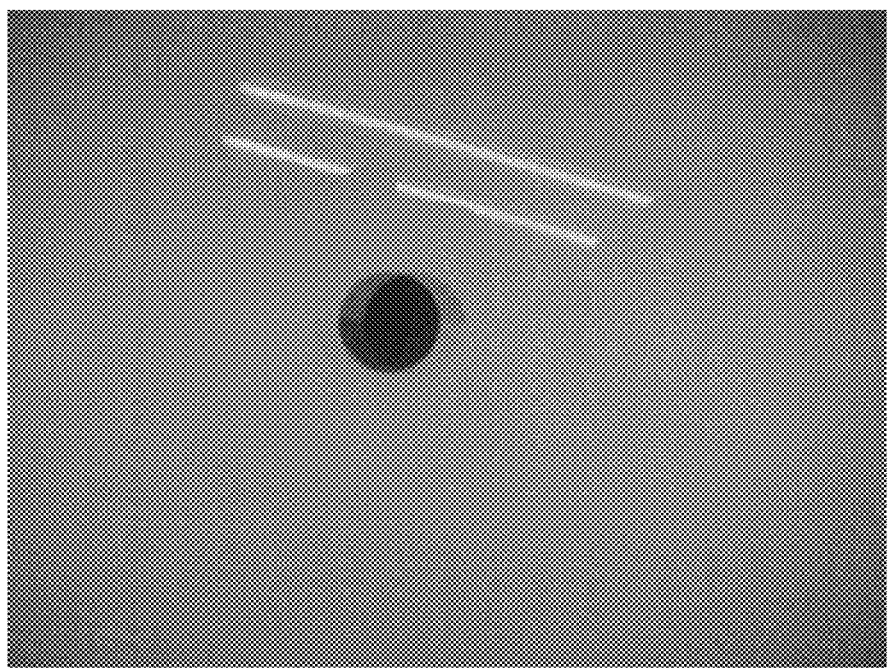

FIGS. 8A and 8B illustrate an example where a moving object is discontinuously seen at a boundary between blocks due to a touch sensing period when the moving object is displayed on the display device. More specifically, FIG. 8B is a real image of a screen of the display device taken with a camera when the screen of the display device is divided into two parts and driven at an interval of time corresponding to a length of a touch sensing period, and the moving object is displayed on the display device.

Referring to FIGS. 8A and 8B, the embodiment herein may divide the screen of the display panel 100 into two parts of first and second blocks 100A and 100B and drive the first and second blocks 100A and 100B at an interval of time corresponding to a length of a touch sensing period. When a moving object is displayed on the display panel 100, the second block 100B holds previous frame data when current frame data is displayed on the first block 100A. Hence, the moving object may be discontinuously displayed at a boundary between the first and second blocks 100A and 100B. Because a discontinuous period (i.e., a touch sensing period) is present between pixel data updating of the first block 100A and pixel data updating of the second block 100B, there is a frame data difference between the blocks.

A phenomenon, in which a boundary between the blocks is discontinuously seen, remarkably appears as the line dim leading to a reduction in output characteristics of an Nth stage of a shift register generating a first gate pulse of a block driven immediately after the touch sensing period. The Nth stage receives a last carry signal of a previous block as a start pulse and pre-charges a Q node. In this instance, because a voltage of the Q node of the Nth stage is discharged during the touch sensing period, an output voltage of the Nth stage is less than other stages.

In one embodiment, the timing controller 106 applies the multi-start signal MVST to an Nth stage of a GIP circuit outputting a first gate pulse in blocks B1 and B2 driven immediately after the touch sensing period and stably pre-charges a Q node of the Nth stage. MVST lines may be added as many as the number of blocks, so as to apply a start pulse VST to each of the blocks B1 to BM. However, this increases a size of a non-display area or a bezel of the display panel 100. The timing controller 106 supplies the multi-start signal MVST including a plurality of pulses to the Nth stages of the blocks through a single MVST line 90 (refer to FIG. 10) so as to supply the start pulse VST to each block without increasing the size of the non-display area of the display panel 100, and disposes the Q charger in the Nth stage so as to prevent an erroneous operation of the GIP circuit.

Figure 9:
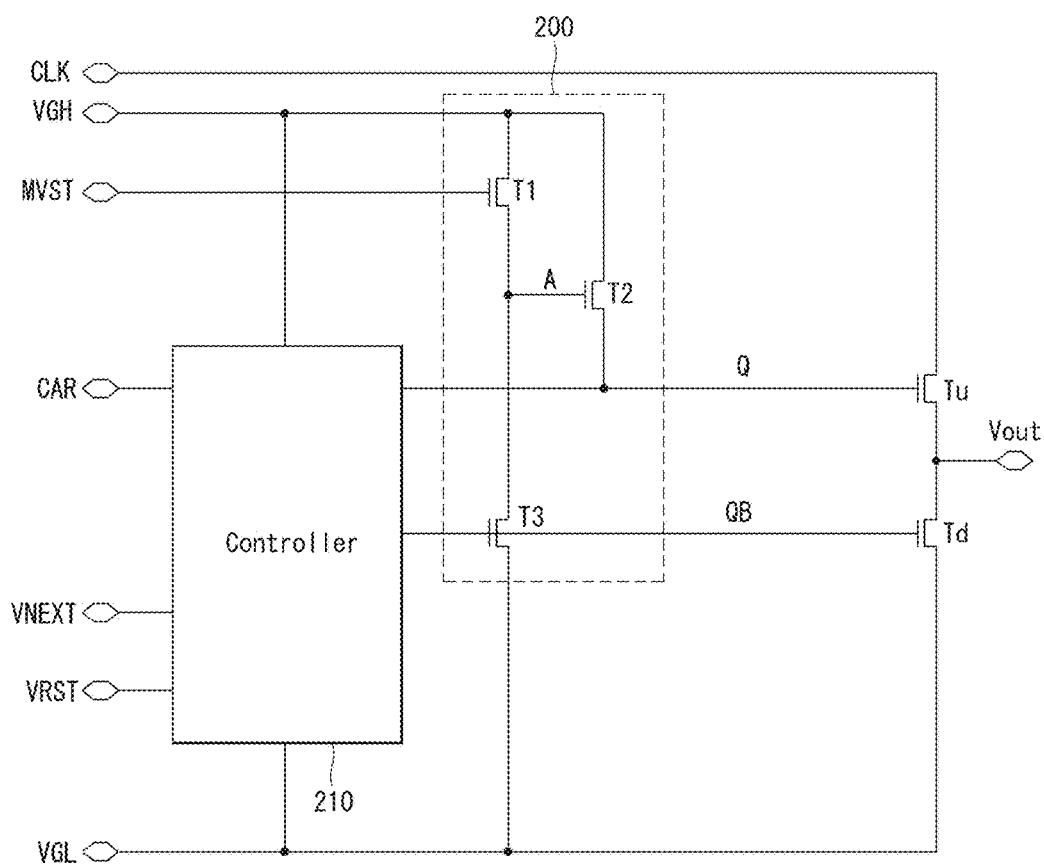
FIG. 9 illustrates a Q charger of a GIP circuit according to an exemplary embodiment.

FIG. 9 illustrates a Q charger of a GIP circuit according to the embodiment. FIG. 10 illustrates a multi-start signal according to the embodiment.

Referring to FIGS. 9 and 10, a GIP circuit according to the embodiment herein includes a Q charger 200 that is disposed at an Nth stage S(N) and charges a Q node in response to a multi-start signal MVST and a voltage of a QB node. The GIP circuit includes transistors that are n-type metal oxide semiconductor field effect transistors (MOSFETs), but is not limited thereto.

The Q chargers 200 may be disposed in the blocks, respectively. The Q charger 200 may be omitted in a first block. Thus, the number of Q chargers 200 included in the GIP circuit may be equal to the number of blocks or the number of blocks minus 1. In other words, the Q charger 200 may be disposed at an Nth stage S(N) outputting a first gate pulse in each of blocks B1 to BM, or disposed at the Nth stage S(N) outputting the first gate pulse in each of the remaining blocks B2 to BM except the first block B1.

Each stage of the GIP circuit includes a pull-up transistor Tu, a pull-down transistor Td, a Q node controlling the pull-up transistor Tu, a QB node controlling the pull-down transistor Td, and a controller 210 controlling the Q node and the QB node in response to an input signal. Each of the stages S(N−1) to S(N+1) pre-charges the Q node in response to the multi-start signal MVST received to a VST terminal or carry signals CAR(N−1) and CAR(N) received from a previous stage and increases a voltage of an output terminal to a gate high voltage VGH when a gate shift clock CLK is input, thereby starting to output a gate pulse.

When the gate pulse is output to the gate line via an output terminal of the stage, the controller 210 discharges a voltage of the QB node and controls the pull-down transistor Td in an off-state. The controller 210 discharges the Q node in response to a reset signal VRST received to an RST terminal or a VNEXT signal received from a next stage after the gate pulse is output, and charges the QB node, thereby controlling a voltage of the output terminal and a voltage of the gate line at a gate low voltage VGL.

The Q node is pre-charged to the gate high voltage VGH and then turns on the pull-up transistor Tu when the gate shift clock CLK is input to the pull-up transistor Tu.

A gate of the pull-up transistor Tu is connected to the Q node. The gate shift clock CLK is supplied to a drain of the pull-up transistor Tu, and a source of the pull-up transistor Tu is connected to the output terminal. The gate shift clock CLK swings between the gate high voltage VGH and the gate low voltage VGL. When the gate shift clock CLK is input in a state where the Q node is pre-charged, the pull-up transistor Tu increases a voltage of the output terminal Vout and outputs the gate pulse. When the gate high voltage VGH of the gate shift clock CLK is supplied to the drain of the pull-up transistor Tu, the pull-up transistor Tu is bootstrapped through a parasitic capacitance between the gate and the drain of the pull-up transistor Tu. Hence, the voltage of the Q node further rises, and the pull-up transistor Tu is turned on. In other words, when the Q node is charged to a predetermined level, a gate pulse is supplied to the output terminal Vout.

The QB node is discharged when the gate pulse is output by the control of the controller 210, and controls the pull-down transistor Td in an off-state. The QB node is charged to the gate high voltage VGH under the control of the controller 210 at the initialization of the GIP circuit or in a period, in which a voltage of the gate line is held at the gate low voltage VGL after the gate pulse, thereby controlling the pull-down transistor Td in an on-state.

Figure 11:
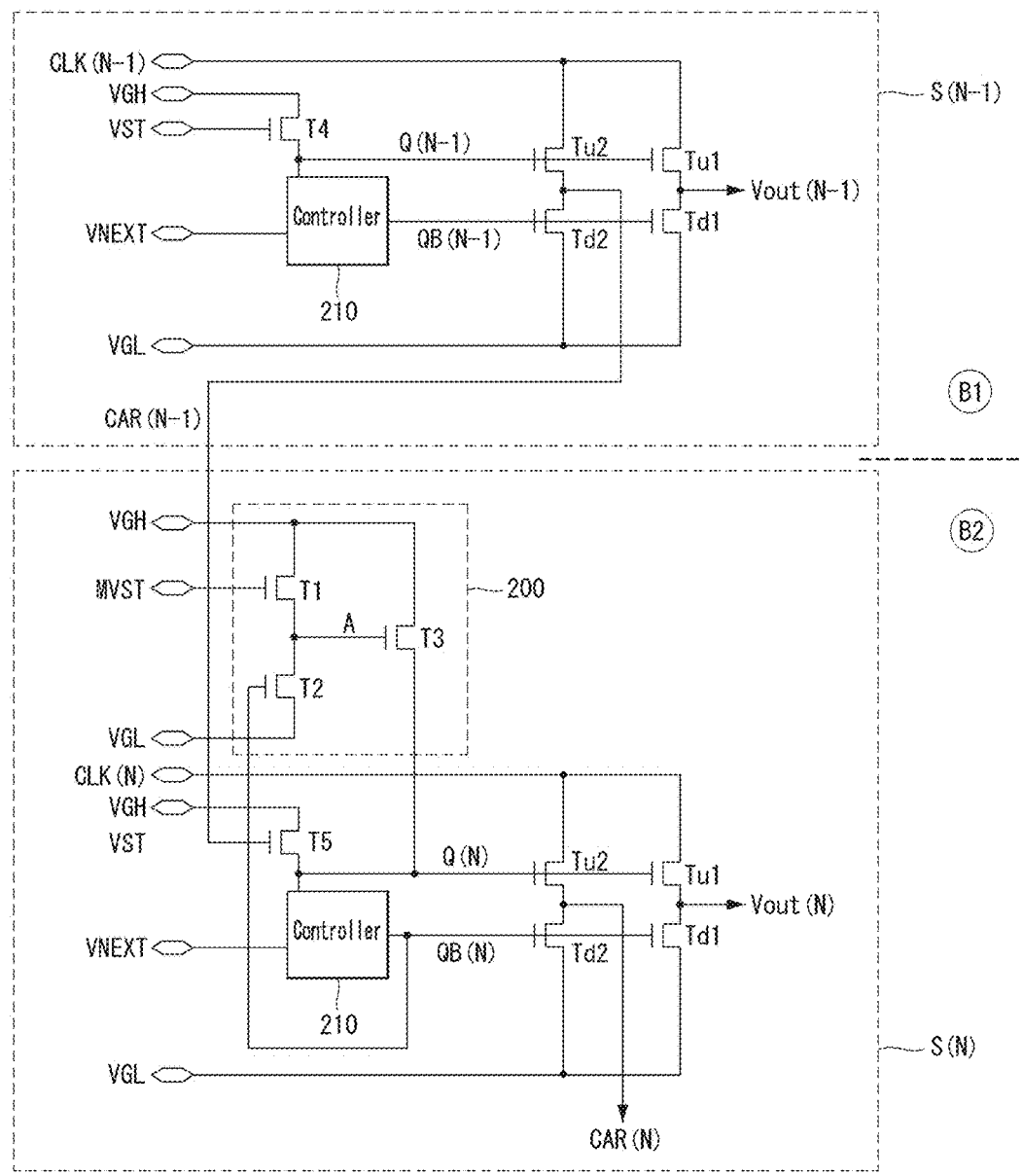
FIG. 11 is a circuit diagram illustrating in detail an (N−1)th stage and an Nth stage of a GIP circuit according to an exemplary embodiment.

Each stage may output one output signal, i.e., the gate pulse, and then may supply the output signal to the gate line and at the same tine supply the output signal to a VST terminal of a next stage as a carry signal. In another embodiment, as shown in FIG. 11, each stage may generate two output signals, and then supply one (Vout(N−1) or Vout(N)) of the two output signals to the gate line as the gate pulse and supply the other (CAR(N−1) or CAR(N)) to a VST terminal of a next stage as a carry signal.

A gate of the pull-down transistor Td is connected to the QB node. A drain of the pull-down transistor Td is connected to the output terminal, and a source of the pull-down transistor Td is connected to a VGL terminal. The gate low voltage VGL is supplied to the VGL terminal.

The Q charger 200 of the Nth stage S(N) includes first to third TFTs T1 to T3.

The first TFT T1 charges an A node to the gate high voltage VGH in response to the multi-start signal MVST. A gate of the first TFT T1 is connected to an MVST terminal. The multi-start signal MVST is input to the MVST terminal. A drain of the first TFT T1 is connected to a VGH terminal supplied with the gate high voltage VGH. A source of the first TFT T1 is connected to a gate of the second TFT T2 and a drain of the third TFT T3 through the A node.

The second TFT T2 is turned on when the first TFT T1 is turned on and the third TFT T3 is turned off. The second TFT T2 supplies the gate high voltage VGH to the Q node and charges the Q node. A charge timing of the Q node is a Q node pre-charging period of the Nth stage S(N) included in the touch sensing period. The Q node has to be charged in a discharge period of the QB node of the Nth stage S(N) (i.e., when the voltage of the Q node is the gate low voltage VGL). The charge timing of the Q node is controlled by the third TFT T3. The gate of the second TFT T2 is connected to the A node. A drain of the second TFT T2 is connected to the VGH terminal, and a source of the second TFT T2 is connected to the Q node. The second TFT T2 operates as a diode when the first TFT T1 is turned on.

The third TFT T3 is turned on when a voltage of the QB node is charged to the gate high voltage VGH, and discharges a voltage of the A node. On the other hand, the third TFT T3 is turned off when the voltage of the QB node is the gate low voltage VGL, and charges the A node. Thus, when the QB node is discharged and the voltage of the QB node reaches the gate low voltage VGL, the Q node is pre-charged. A gate of the third TFT T3 is connected to the QB node. The drain of the third TFT T3 is connected to the A node, and a source of the third TFT T3 is connected to the VGH terminal.

In FIG. 10, "Tsync" is a sync signal defining display periods Td1 to Td17 and touch sensing periods Tt1 to Tt16 at different logic levels. The touch sensing unit 110 senses a touch input in response to the sync signal Tsync and is synchronized with the display driving circuit (102, 104, and 106).

Figure 12:
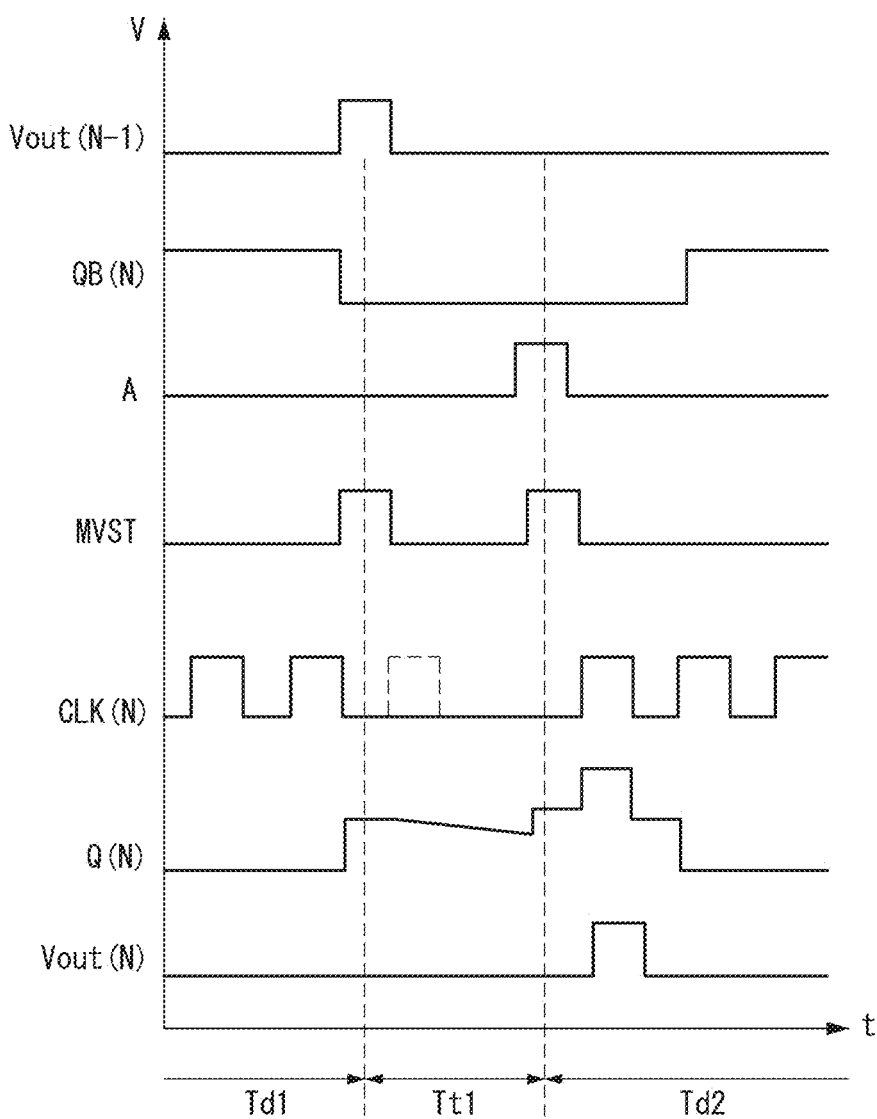
FIG. 12 is a waveform diagram illustrating an input and output waveform of a circuit shown in FIG. 11.
Figure 13:
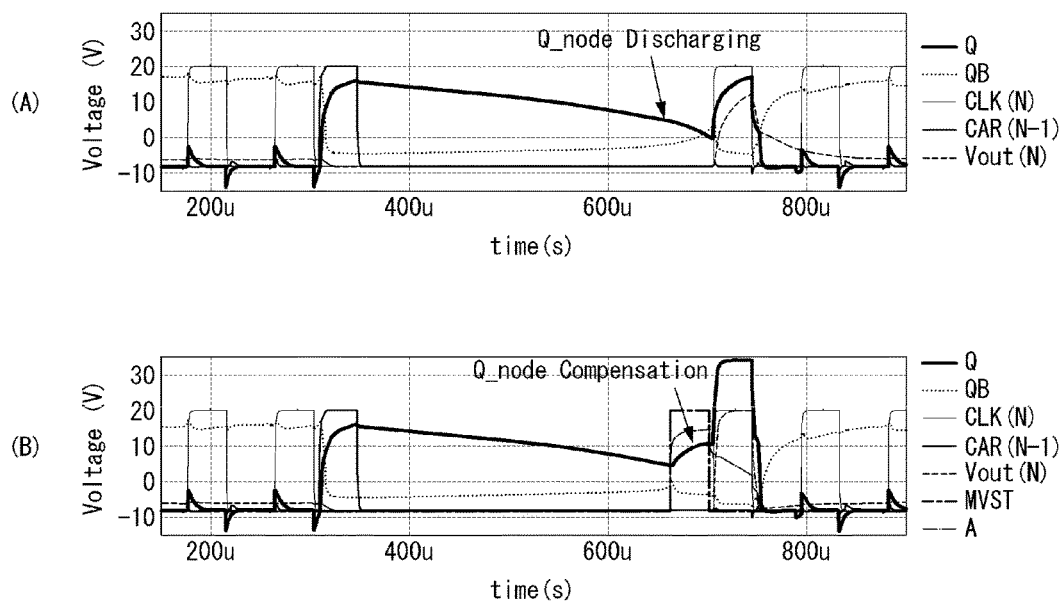
FIG. 13 illustrates a simulation result of a pre-charging effect of a Q node of an Nth stage using a multi-start signal.

FIG. 11 is a circuit diagram illustrating in detail an (N−1)th stage and an Nth stage. FIG. 12 is a waveform diagram illustrating an input and output waveform of a circuit shown in FIG. 11. In FIG. 12, x-axis is time (t), and y-axis is a voltage (V). FIG. 13 illustrates a simulation result of a pre-charging effect of a Q node of an Nth stage using a multi-start signal.

Referring to FIGS. 11 and 12, an (N−1)th stage S(N−1) and an Nth stage S(N) are a part of a shift register circuit disposed at a boundary between adjacent blocks B1 and B2 in the GIP circuit.

For example, the (N−1)th stage S(N−1) is a last stage generating a last gate pulse in the first block B1. The multi-start signal MVST is not supplied to the (N−1)th stage S(N−1), and the (N−1)th stage S(N−1) does not include the Q charger 200. Conventionally, a GIP circuit is implemented as a shift register, and stages having the same circuit configuration as the (N−1)th stage S(N−1) are cascade-connected.

The (N−1)th stage S(N−1) includes a Q node charging transistor T4, first and second pull-up transistors Tu1 and Tu2, first and second pull-down transistors Td1 and Td2, a Q node Q(N−1) controlling the first and second pull-up transistors Tu1 and Tu2, a QB node QB(N−1) controlling the first and second pull-down transistors Td1 and Td2, and a controller 210 controlling the Q node Q(N−1) and the QB node QB(N−1) in response to an input signal.

The Q node charging transistor T4 supplies the gate high voltage VGH to the Q node Q(N−1) in response to a carry signal from a previous stage (i.e., an (N−2)th stage S(N−2)) and charges the Q node Q(N−1). Note the Q node Q(N−1) does not receive MVST. A gate of the Q node charging transistor T4 is connected to a VST terminal receiving the carry signal from the previous stage. A drain of the Q node charging transistor T4 is connected to a VGH terminal supplied with the gate high voltage VGH. A source of the Q node charging transistor T4 is connected to the Q node Q(N−1).

The first pull-up transistor Tu1 and the first pull-down transistor Td1 charge and discharge the gate line connected to a first output terminal. A gate of the first pull-up transistor Tu1 is connected to the Q node Q(N−1). An (N−1)th gate shift clock CLK(N−1) is supplied to a drain of the first pull-up transistor Tu1, and a source of the first pull-up transistor Tu1 is connected to the first output terminal. A gate of the first pull-down transistor Td1 is connected to the QB node QB(N−1). A drain of the first pull-down transistor Td1 is connected to the first output terminal, and a source of the first pull-down transistor Td1 is connected to a VGL terminal.

The second pull-up transistor Tu2 and the second pull-down transistor Td2 charge and discharge a carry signal line connected to a second output terminal. A gate of the second pull-up transistor Tu2 is connected to the Q node Q(N−1). The (N−1)th gate shift clock CLK(N−1) is supplied to a drain of the second pull-up transistor Tu2, and a source of the second pull-up transistor Tu2 is connected to the second output terminal. A gate of the second pull-down transistor Td2 is connected to the QB node QB(N−1). A drain of the second pull-down transistor Td2 is connected to the second output terminal, and a source of the second pull-down transistor Td2 is connected to the VGL terminal.

For example, the Nth stage S(N) is a first stage outputting a first gate pulse in the second block B2 of pixels that is adjacent to and driven subsequent to the first block B1 of pixels. The Nth stage S(N) receives a multi-start signal MVST through a single MVST line 90 (refer to FIG. 10) and includes a Q charger 200.

The Nth stage S(N) further includes a Q node charging transistor T5, first and second pull-up transistors Tu1 and Tu2, first and second pull-down transistors Td1 and Td2, a Q node Q(N) controlling the first and second pull-up transistors Tu1 and Tu2, a QB node QB(N) controlling the first and second pull-down transistors Td1 and Td2, and a controller 210 controlling the Q node Q(N) and the QB node QB(N) in response to an input signal.

The Q node charging transistor T5 supplies the gate high voltage VGH to the Q node Q(N) in response to a carry signal CAR(N−1) from a previous stage (i.e., the (N−1)th stage S(N−1)) and charges the Q node Q(N). A gate of the Q node charging transistor T5 is connected to a VST terminal receiving the carry signal CAR(N−1). A drain of the Q node charging transistor T5 is connected to a VGH terminal supplied with the gate high voltage VGH. A source of the Q node charging transistor T5 is connected to the Q node Q(N).

The first pull-up transistor Tu1 and the first pull-down transistor Td1 charge and discharge the gate line connected to a first output terminal. A gate of the first pull-up transistor Tu1 is connected to the Q node Q(N). An Nth gate shift clock CLK(N) is supplied to a drain of the first pull-up transistor Tu1, and a source of the first pull-up transistor Tu1 is connected to the first output terminal. A gate of the first pull-down transistor Td1 is connected to the QB node QB(N). A drain of the first pull-down transistor Td1 is connected to the first output terminal, and a source of the first pull-down transistor Td1 is connected to a VGL terminal.

The second pull-up transistor Tu2 and the second pull-down transistor Td2 charge and discharge a carry signal line connected to a second output terminal. A gate of the second pull-up transistor Tu2 is connected to the Q node Q(N). The Nth gate shift clock CLK(N) is supplied to a drain of the second pull-up transistor Tu2, and a source of the second pull-up transistor Tu2 is connected to the second output terminal. A gate of the second pull-down transistor Td2 is connected to the QB node QB(N). A drain of the second pull-down transistor Td2 is connected to the second output terminal, and a source of the second pull-down transistor Td2 is connected to the VGL terminal.

Figure 14:
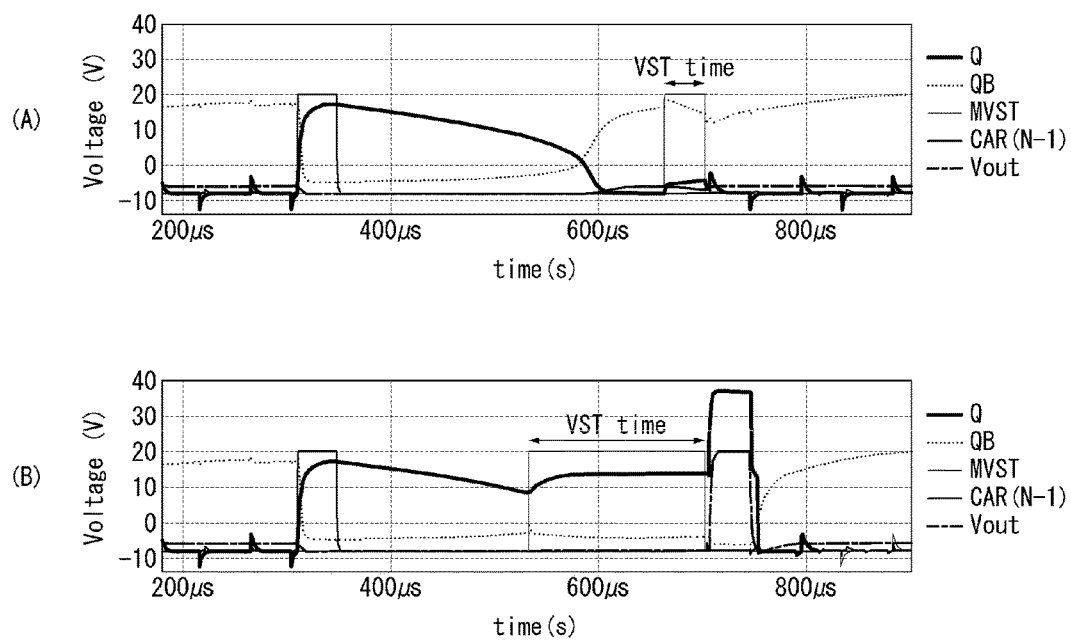
FIG. 14 illustrates an example of varying a width of a multi-start signal.

As can be seen from FIG. 12, the Q node Q(N) of the Nth stage S(N) is discharged during a touch sensing period Tt1 and is charged when the multi-start signal MVST is generated, thereby outputting a gate pulse of a normal voltage level. The multi-start signal MVST may be generated during the touch sensing period Tt1, which provides a gap in time between the display periods Td1 and Td2 used to drive the blocks B1 and B2, respectively. For example, as shown in FIG. 12, the multi-start signal MVST may be generated at a start timing and an end timing of the touch sensing period Tt1, or only at the end timing of the touch sensing period Tt1. The multi-start signal MVST may be generated before a first gate pulse is generated in a display period Td2 following the touch sensing period Tt1. In order to control a pre-charging voltage of the Q node, the multi-start signal MVST may be advanced, or a width of the multi-start signal MVST may vary as shown in FIG. 14. Therefore, the generation timing of the multi-start signal MVST is not limited to a specific timing of the touch sensing period Tt1.

FIG. 13, part (A) illustrates an example where an output voltage Vout(N) is reduced due to the discharge of a Q node during a touch sensing period when circuit configuration of an existing stage not including a multi-start signal and a Q charger is applied to an Nth stage. On the contrary, as shown in FIG. 13, part (B), the embodiment herein compensates for a reduction in a voltage of a Q node discharged during a touch sensing period because the Q node is charged at a generation timing of a multi-start signal MVST, and thus can generate an output voltage Vout(N) of a desired voltage level (for example, the gate high voltage VGH). When the multi-start signal MVST is generated, the voltage of the Q node may rise at the same level as a pre-charging voltage of Q nodes of other stages. A charge timing and a voltage level of the Q node may be controlled by adjusting the generation timing of the multi-start signal MVST.

FIG. 14 illustrates an example of varying a width of a multi-start signal.

Referring to FIG. 14, a charge level of a Q node may be determined depending on a model or driving characteristics of a display device. In this instance, a sharp discharge of the Q node is compensated by advancing a rising timing of a multi-start signal MVST and increasing a width of the multi-start signal MVST, and thus an output voltage can be controlled at a desired voltage level. On the contrary, when a discharge voltage of the Q node is low, the Q node can be prevented from being overcompensated by decreasing the width of the multi-start signal MVST.

Figure 15:
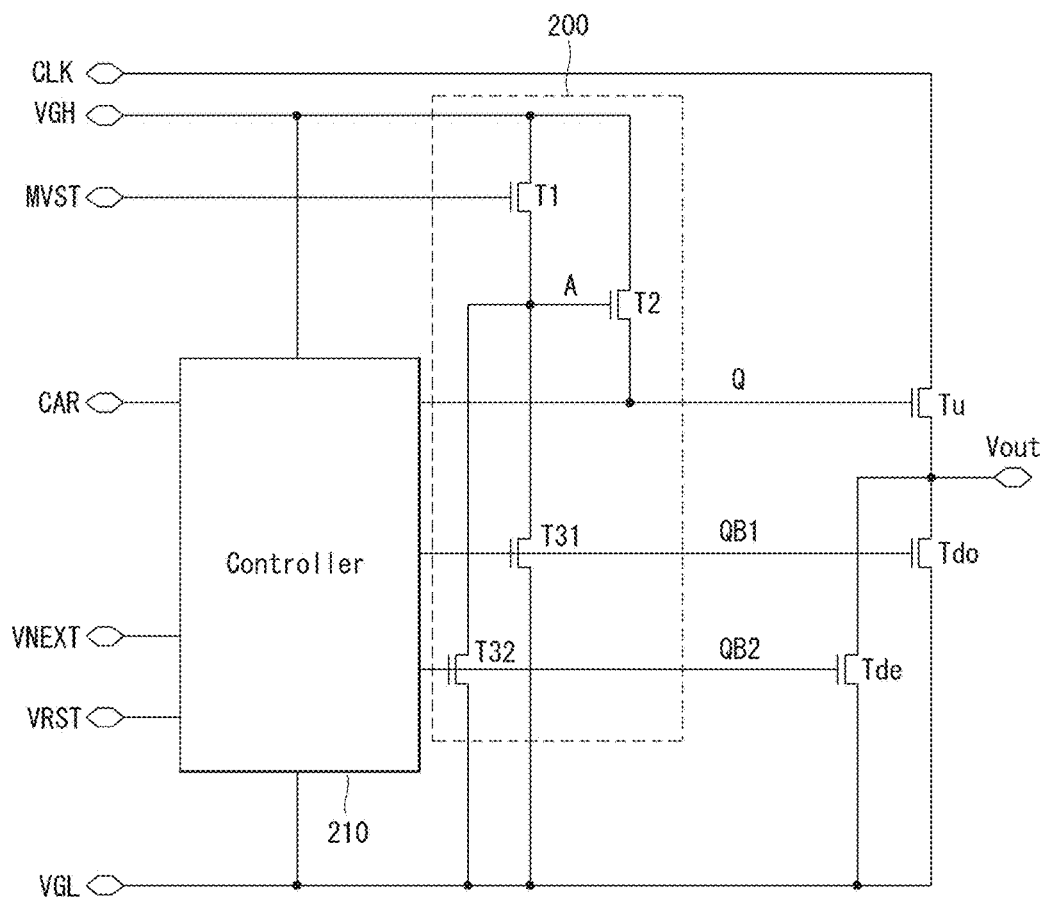
FIG. 15 is a circuit diagram illustrating circuit configuration of an Nth stage according to another exemplary embodiment.

Technology for driving pull-down transistors without changing characteristics of the pull-down transistors during a touch sensing period at one stage including a plurality of QB nodes and the plurality of pull-down transistors, are disclosed in Korean Patent Publication No. 10-2013-0129620, published on Nov. 29, 2013. FIG. 15 illustrates another embodiment applied to such a GIP circuit.

Referring to FIG. 15, a GIP circuit according to an embodiment includes a Q charger 200 that is disposed at an Nth stage S(N) and charges a Q node in response to a multi-start signal MVST and a voltage of a QB node.

The number of Q chargers 200 included in the GIP circuit may be equal to the number of blocks or the number of blocks minus 1. In other words, the Q charger 200 may be disposed at an Nth stage S(N) outputting a first gate pulse in each of blocks B1 to BM, or disposed at the Nth stage S(N) outputting the first gate pulse in each of the remaining blocks B2 to BM except the first block B1.

The Nth stage S(N) includes a pull-up transistor Tu, first and second pull-down transistors Tdo and Tde, a Q node Q controlling the pull-up transistor Tu, a first QB node QB1 controlling the first pull-down transistor Tdo, a second QB node QB2 controlling the second pull-down transistor Tde, and a controller 210 controlling the Q node Q and the QB nodes QB1 and QB2 in response to an input signal.

A gate of the pull-up transistor Tu is connected to the Q node Q. A gate shift clock CLK is supplied to a drain of the pull-up transistor Tu, and a source of the pull-up transistor Tu is connected to an output terminal.

A gate of the first pull-down transistor Tdo is connected to the first QB node QB1. A drain of the first pull-down transistor Tdo is connected to the output terminal, and a source of the first pull-down transistor Tdo is connected to a VGL terminal. A gate of the second pull-down transistor Tde is connected to the second QB node QB2. A drain of the second pull-down transistor Tde is connected to the output terminal, and a source of the second pull-down transistor Tde is connected to the VGL terminal.

The Q charger 200 of the Nth stage S(N) includes a plurality of TFTs T1, T2, T31, and T32.

The first TFT T1 charges an A node to the gate high voltage VGH in response to the multi-start signal MVST. A gate of the first TFT T1 is connected to an MVST terminal. A drain of the first TFT T1 is connected to a VGH terminal. A source of the first TFT T1 is connected to a gate of the second TFT T2 and drains of the 3a and 3b TFTs T31 and T32 through the A node.

The second TFT T2 is turned on when the first TFT T1 is turned on and the 3a and 3b TFTs T31 and T32 are turned off. The second TFT T2 supplies the gate high voltage VGH to the Q node and charges the Q node. The gate of the second TFT T2 is connected to the A node. A drain of the second TFT T2 is connected to the VGH terminal, and a source of the second TFT T2 is connected to the Q node Q. The second TFT T2 operates as a diode when the first TFT T1 is turned on.

The 3a TFT T31 is turned on when a voltage of the first QB node QB1 is charged to the gate high voltage VGH, and discharges a voltage of the A node. On the other hand, the 3a TFT T31 is turned off when the voltage of the first QB node QB1 is the gate low voltage VGL, and charges the A node. The 3b TFT T32 is turned on when a voltage of the second QB node QB2 is charged to the gate high voltage VGH, and discharges a voltage of the A node. On the other hand, the 3b TFT T32 is turned off when the voltage of the second QB node QB2 is the gate low voltage VGL, and charges the A node. The first and second QB nodes QB1 and QB2 may be alternately charged and discharged by the controller 210. Thus, when the first QB node QB1 or the second QB node QB2 is discharged and the voltage of the first QB node QB1 or the second QB node QB2 reaches the gate low voltage VGL, the Q node Q is pre-charged. A gate of the 3a TFT T31 is connected to the first QB node QB1. The drain of the 3a TFT T31 is connected to the A node, and a source of the 3a TFT T31 is connected to the VGH terminal. A gate of the 3b TFT T32 is connected to the second QB node QB2. The drain of the 3b TFT T32 is connected to the A node, and a source of the 3b TFT T32 is connected to the VGH terminal.

As described above, the embodiment increases the voltage of the Q node discharged during the touch sensing period at a boundary between the blocks, that are divided from the display panel and driven, using the multi-start signal, and thus can prevent the luminance reduction or the line dim at a boundary between the adjacent blocks.

Although embodiments have been described with reference to a number of illustrative embodiments thereof, numerous other modifications and embodiments may be devised by those skilled in the art that will fall within the scope of the principles of this disclosure. In particular, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device including a touch screen comprising:
a display panel including:
pixels at intersections of data lines and gate lines, grouped into a plurality of blocks, and dividedly driven, each of the plurality of blocks connected to a different set of the gate lines, each set including at least a first gate line and a last gate line, and
a plurality of touch electrodes;
a display driving circuit configured to apply data of an input image to the pixels in a plurality of display periods divided from one frame period including at least a first display period and a second display period;
a touch sensing unit configured to drive the touch electrodes in a touch sensing period assigned between the first display period and the second display period of the one frame period; and
a timing controller configured to generate a multi-start signal including a plurality of pulses at predetermined time intervals in the one frame period,
wherein a first block of the plurality of blocks is driven during the first display period, and a second block of the plurality of blocks adjacent to the first block is driven during the second display period following the touch sensing period,
wherein the display driving circuit includes an (N−1)th stage configured to drive a last gate line of the first block and an Nth stage configured to drive a first gate line of the second block,
wherein the Nth stage includes a charger configured to charge a Q node of the Nth stage in the touch sensing period in response to the multi-start signal before the second display period starts, and
wherein another charger is disposed at a corresponding stage driving the first gate line of each block, or disposed at a corresponding stage driving the first gate line of each block except the first block.

2. The display device including the touch screen of claim 1, wherein the display panel includes a single start line supplying the multi-start signal to a plurality of stages of the display driving circuit.

3. The display device including the touch screen of claim 1, wherein the multi-start signal includes a number of pulses equal to the number of blocks or the number of blocks minus 1 during the one frame period.

4. The display device including the touch screen of claim 1, wherein the display driving circuit includes a shift register disposed on a substrate of the display panel and configured to supply a gate pulse to the gate lines of the display panel and shift the gate pulse in response to a gate shift clock,
wherein the shift register includes a plurality of stages that are cascade-connected,
wherein each stage includes a pull-up transistor configured to charge an output terminal of the corresponding stage when the gate shift clock is input in response to a voltage of a Q node of the corresponding stage and a pull-down transistor configured to discharge the output terminal in response to a voltage of a QB node of the corresponding stage, and
wherein the charger includes:
a first transistor including a gate supplied with the multi-start signal, a drain supplied with a gate high voltage, and a source connected to an A node of the Nth stage,
a second transistor including a gate connected to the A node, a drain supplied with the gate high voltage, and a source connected to the Q node; and
a third transistor including a gate connected to a QB node of the Nth stage, a drain connected to the A node, and a source supplied with a gate low voltage less than the gate high voltage.

5. The display device including the touch screen of claim 1, wherein the display driving circuit includes a shift register disposed on a substrate of the display panel and configured to supply a gate pulse to the gate lines of the display panel and shift the gate pulse in response to a gate shift clock,
wherein the shift register includes a plurality of stages that are cascade-connected,
wherein each stage includes a pull-up transistor configured to charge an output terminal of the corresponding stage when the gate shift clock is input in response to a voltage of a Q node of the corresponding stage, a first pull-down transistor configured to discharge the output terminal in response to a voltage of a first QB node of the corresponding stage, and a second pull-down transistor configured to discharge the output terminal in response to a voltage of a second QB node of the corresponding stage, and wherein the charger includes:
a first transistor including a gate supplied with the multi-start signal, a drain supplied with a gate high voltage, and a source connected to an A node of the Nth stage;
a second transistor including a gate connected to the A node, a drain supplied with the gate high voltage, and a source connected to the Q node;
a 3a transistor including a gate connected to a first QB node of the Nth stage, a drain connected to the A node, and a source supplied with a gate low voltage less than the gate high voltage; and
a 3b transistor including a gate connected to a second QB node of the Nth stage, a drain connected to the A node, and a source supplied with the gate low voltage.

6. A driving circuit of a display device including a touch screen including a display panel including pixels at intersections of data lines and gate lines, grouped into a plurality of blocks, and dividedly driven, each of the plurality of blocks connected to a different set of the gate lines, each set including at least a first gate line and a last gate line, and a plurality of touch electrodes, a first block of the plurality of blocks being driven during a first display period, and a second block of the plurality of blocks adjacent to the first block and being driven during a second display period, the driving circuit comprising:
a touch sensing unit configured to drive the touch electrodes during a touch sensing period subsequent to the first display period but prior to the second display period;
a timing controller configured to generate a multi-start signal including a plurality of pulses at predetermined time intervals in one frame period; and
a shift register including an (N−1)th stage configured to drive a last gate line of the first block and an Nth stage configured to drive a first gate line of the second block, the Nth stage including a charger configured to charge a Q node of the Nth stage in response to the multi-start signal in the touch sensing period before the second display period starts,
wherein another charger is disposed at a corresponding stage driving the first gate line of each block, or disposed at a corresponding stage driving the first gate line of each block except the first block.

7. The driving circuit of claim 6, wherein the multi-start signal is supplied to a plurality of stages of the driving circuit through a single start line.

8. The driving circuit of claim 6, wherein the multi-start signal includes a number of pulses equal to the number of blocks minus 1 during the one frame period.

9. The driving circuit of claim 6, wherein the shift register is disposed on a substrate of the display panel and includes a plurality of stages that are cascade-connected,
wherein each stage includes a pull-up transistor configured to charge an output terminal of the corresponding stage when a gate shift clock is input in response to a voltage of a Q node of the corresponding stage and a pull-down transistor configured to discharge the output terminal in response to a voltage of a QB node of the corresponding stage, and
wherein the charger includes:
a first transistor including a gate supplied with the multi-start signal, a drain supplied with a gate high voltage, and a source connected to an A node of the Nth stage;
a second transistor including a gate connected to the A node, a drain supplied with the gate high voltage, and a source connected to the Q node; and
a third transistor including a gate connected to a QB node of the Nth stage, a drain connected to the A node, and a source supplied with a gate low voltage less than the gate high voltage.

10. The driving circuit of claim 6, wherein the shift register is disposed on a substrate of the display panel and includes a plurality of stages that are cascade-connected,
wherein each stage includes a pull-up transistor configured to charge an output terminal of the corresponding stage when a gate shift clock is input in response to a voltage of a Q node of the corresponding stage, a first pull-down transistor configured to discharge the output terminal in response to a voltage of a first QB node of the corresponding stage, and a second pull-down transistor configured to discharge the output terminal in response to a voltage of a second QB node of the corresponding stage, and
wherein the charger includes:
a first transistor including a gate supplied with the multi-start signal, a drain supplied with a gate high voltage, and a source connected to an A node of the Nth stage;
a second transistor including a gate connected to the A node, a drain supplied with the gate high voltage, and a source connected to the Q node;
a 3a transistor including a gate connected to a first QB node of the Nth stage, a drain connected to the A node, and a source supplied with a gate low voltage less than the gate high voltage; and
a 3b transistor including a gate connected to a second QB node of the Nth stage, a drain connected to the A node, and a source supplied with the gate low voltage.

11. A display device comprising:
a display panel including a plurality of blocks of pixels at intersections of a plurality of gate lines and a plurality of data lines, the plurality of blocks of pixels including at least a first block and a second block adjacent to the first block, each of the plurality of blocks connected to a different set of the plurality of gate lines, each set including at least a first gate line and a last gate line, the first block driven to display during a first display period of a frame and the second block driven to display during a second display period of the frame, the second display period subsequent to and separated in time from the first display period by a predetermined period; and
a gate driver circuit to drive gate lines of the display panel, the gate driver circuit including at least a first stage and a second stage to a first gate line of the first block and a second gate line of the second block, respectively, the first gate line and the second gate line being adjacent to each other, the second stage including a charger circuit configured to charge a Q node of the second stage during the predetermined period prior to the second display period, a gate pulse being supplied to the second gate line during at least a portion of the second display period when the Q node is charged to a predetermined level,
wherein another charger is disposed at a corresponding stage driving the first gate line of each block, or disposed at a corresponding stage driving the first gate line of each block except the first block.

12. The display device of claim 11, further comprising a timing controller that generates a plurality of timing signals to control timing of the first display period, the second display period, and the predetermined period between the first display period and the second display period, the timing signals including a start signal responsive to which the charger circuit of the second stage charges the Q node during the predetermined period.

13. The display device of claim 11, further comprising a plurality of touch electrodes and a touch driver circuit, the touch driver circuit configured to drive the touch electrodes corresponding to at least one of the first block and the second block during the predetermined period.

14. The display device of claim 13, wherein the touch electrodes function as a common electrode for the pixels to which a common voltage is applied, during the first display period and the second display period.

15. The display device of claim 11, wherein none of the pixels are driven to display between the first display period and the second display period.

16. The display device of claim 11, wherein the second stage includes a pull-up transistor configured to charge an output terminal coupled to the second gate line of the second block in response to a voltage of the Q node and a pull-down transistor configured to discharge the output terminal in response to a voltage of a QB node of the second stage, the gate pulse being supplied by the output terminal.

17. The display device of claim 11, wherein the charger circuit includes:
 a first transistor including a gate supplied with a timing signal, a drain supplied with a gate high voltage, and a source connected to an A node of the second stage;
 a second transistor including a gate connected to the A node, a drain supplied with the gate high voltage, and a source connected to the Q node; and
 a third transistor including a gate connected to a QB node of the second stage, a drain connected to the A node, and a source supplied with a gate low voltage less than the gate high voltage.

18. The display device of claim 11, wherein the charger circuit of the second stage charges the Q node in response to a timing signal generated outside the gate driver circuit.

* * * * *